F. R. FAGEOL.
VEHICLE RADIATOR MOUNTING AND INCLOSING MEMBER.
APPLICATION FILED JUNE 20, 1917.
1,263,543.
Patented Apr. 23, 1918.
2 SHEETS—SHEET 1.
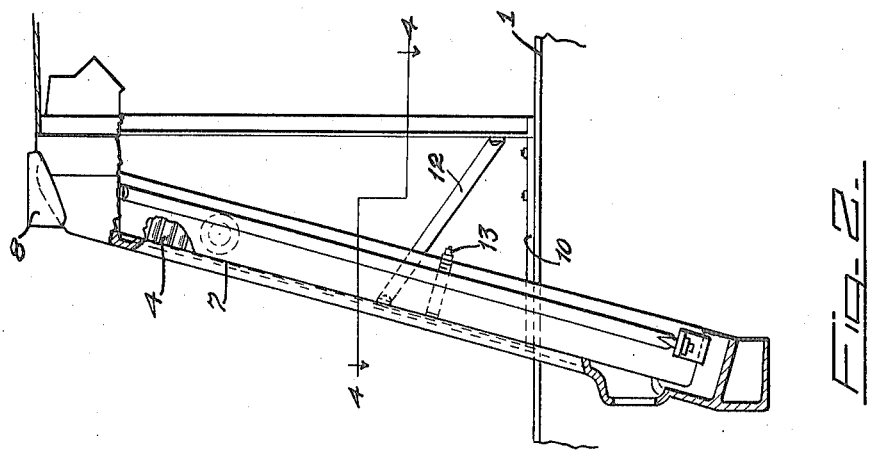
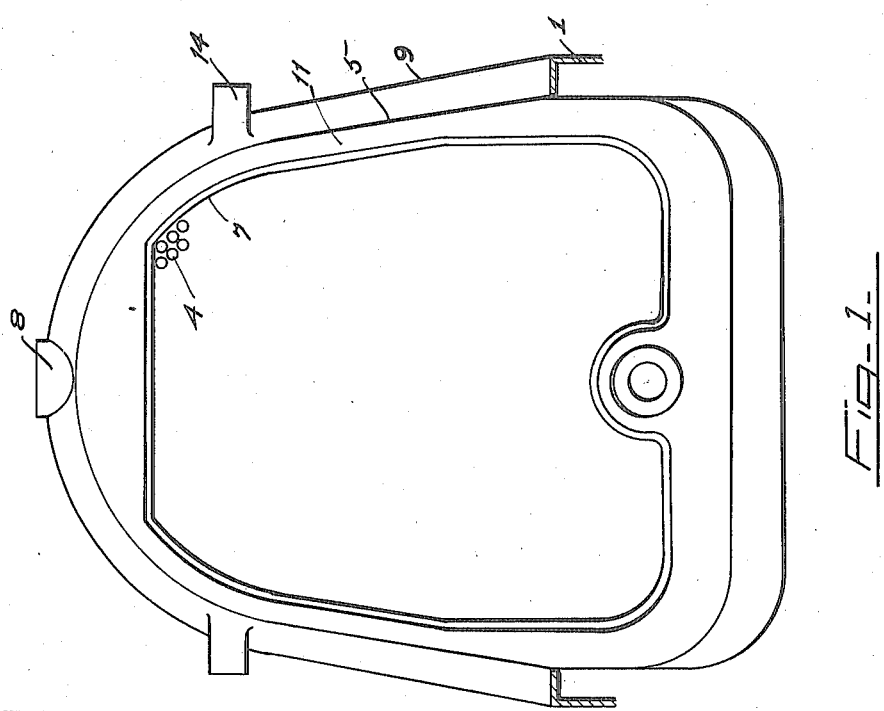
WITNESS:
INVENTOR.
BY
ATTORNEYS.

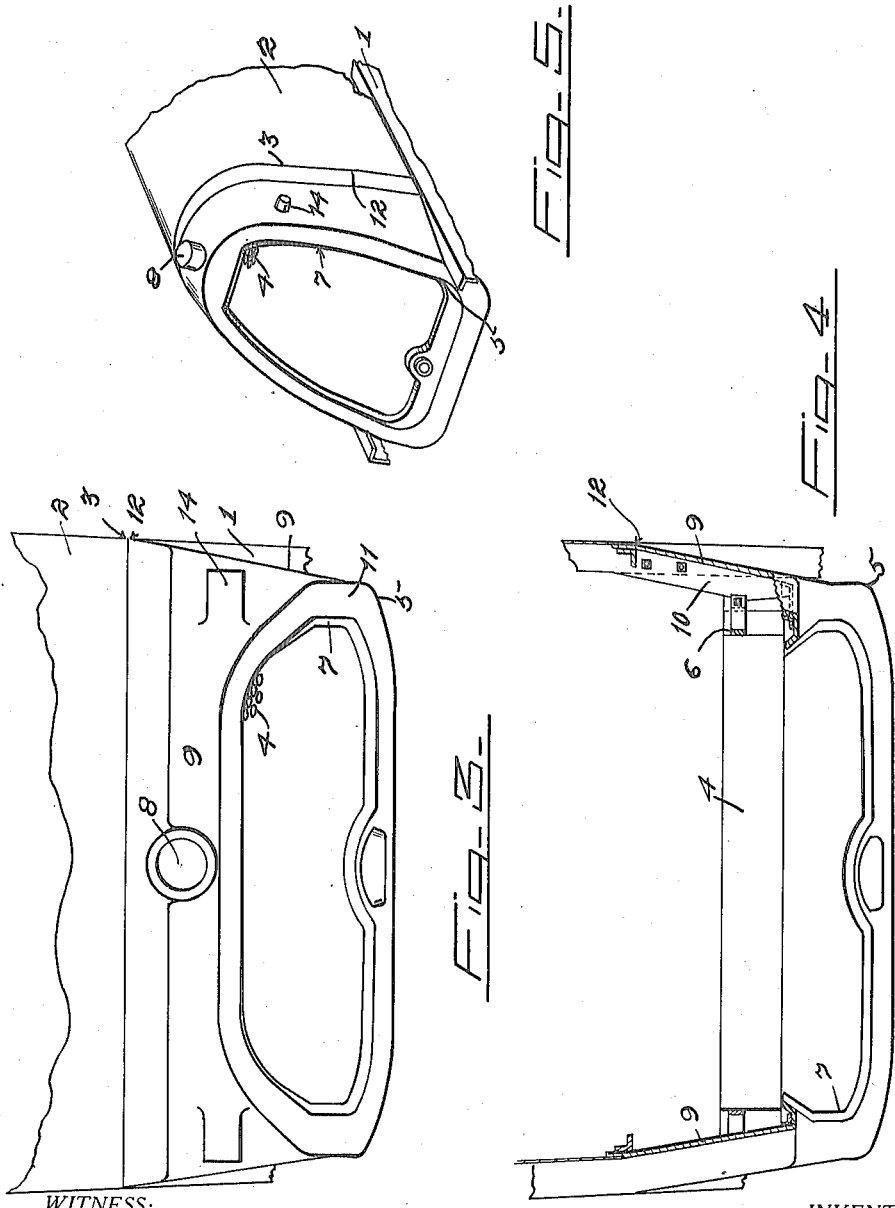

UNITED STATES PATENT OFFICE.

FRANK R. FAGEOL, OF OAKLAND, CALIFORNIA.

VEHICLE-RADIATOR MOUNTING AND INCLOSING MEMBER.

1,263,543.

Specification of Letters Patent.

Patented Apr. 23, 1918.

Application filed June 20, 1917. Serial No. 175,787.

*To all whom it may concern:*

Be it known that I, FRANK R. FAGEOL, a citizen of the United States, residing at Oakland, in the county of Alameda and State of California, have invented certain new and useful Improvements in Vehicle-Radiator Mountings and Inclosing Members, of which the following is a specification.

This invention relates to a radiator supporting or construction for motor vehicles and by the employment of which the radiator when in position on the vehicle frame is sloped backwardly from bottom to top and a vertical edge is provided at the rear thereof for coöperation with the forward perpendicular edge of the vehicle hood.

The invention has for its principal objects to provide a shroud construction for vehicle radiators, preferably of cast metal, and within which the radiator proper is detachably secured, the front wall of said shroud slopes backwardly from bottom to top with the side walls thereof extending rearwardly therefrom, the lower edges thereof being fashioned to lie parallel with the vehicle frame, and the rear edge adapted to be perpendicularly disposed, whereby the appearance of and lines of the vehicle hood construction are beautified, and permitting the employment in connection with an inclined radiator, of a hood member having a perpendicular front end wall.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in elevation of the preferred embodiment of my invention.

Fig. 2 is a vertical sectional view taken centrally through Fig. 1.

Fig. 3 is a view in top plan of the construction illustrated in Fig. 1.

Fig. 4 is a sectional view taken on line 4—4 of Fig. 2 viewed in the direction of the arrows.

Fig. 5 is a view in perspective of the preferred embodiment of my invention in position on a vehicle frame.

Referring more particularly to the several views of the drawings, wherein like characters of reference designate corresponding parts, 1 indicates a suitable vehicle frame, the forward end of which supports a radiator construction and housing therefor, and the intervening space between the rear of the radiator housing and the body (not shown) is adapted to be closed by the usual hood 2 having a perpendicular front or forward edge 3. The radiator construction and housing consists of the usual cellular type of radiator 4 positioned within a shroud 5 and removably held therein by a suitable band 6 secured at its upper end to the shroud and surrounding the side walls of the radiator, as in Fig. 2 of the drawings. The shroud is preferably of cast metal, and is provided in its front with the opening 7 and at its top with the filler opening 8, communicating with the interior of the radiator, in any suitable manner.

Extending rearwardly from the upper and side portions of the shroud 5 are the top and side walls 9, the side walls being disposed or inclined outwardly toward the rear thereof and increasing in width toward the base thereof, as in Fig. 4. The lower edges of the side walls 9 are flanged, as at 10, and are adapted to lie on the vehicle frame 1, as in Figs. 2 and 4 of the drawings, in such manner that the front wall 11 of the shroud is inclined rearwardly in a vertical plane. The side walls 9 also terminate short of the bottom of the shroud whereby the radiator projects between and below the vehicle frame member 1, as in Figs. 1 and 5 of the drawings. The rear edge of the shroud 1 is perpendicularly disposed as at 12 to correspond with the perpendicular edge 3 of the vehicle hood 2. The constructing of the shroud in this manner permits of the rearward inclination of the radiator and the coöperation with the rear edge of the shroud of the forward edge of the usual hood construction.

Suitable braces 12 and 13 are provided within the shroud to maintain the radiator 4 in position therein, and extending laterally from the side walls of said shroud, adjacent the top thereof, are suitable integral tubular brackets 14 through which are adapted to extend arms, not illustrated, for supporting the vehicle lamps, not shown in the drawings.

By my improved construction, I provide a radiator shroud formed of cast metal within which the radiator proper is detachably secured, and construct said shroud in such a manner that the forward or front edge of the same is rearwardly inclined with the side edges resting on and supported by the vehicle frame, the rear edges of said side portions being perpendicularly disposed so as to permit of the employment of the usual type of vehicle hood.

Having thus described my invention, what I claim as new and desire to protect by Letters Patent is:—

1. In combination with a motor driven vehicle, a cooling radiator therefor, a shroud resting on the vehicle frame for detachably receiving and inclosing the side, top and bottom walls of said radiator, the front wall of said shroud sloped backwardly from bottom to top.

2. In combination with a motor driven vehicle, a cooling radiator therefor, a shroud resting on the vehicle frame for detachably receiving and inclosing the side, top and bottom walls of said radiator, the front wall of said shroud sloped backwardly from bottom to top, and the rear edges of said shroud side walls being substantially perpendicularly disposed.

3. A shroud for motor vehicle radiators, comprising a cast metal open body within which the radiator is received, said shroud having rearwardly disposed side walls tapering from their lower to their upper ends and the lower edge thereof disposed at right angles to the rear edge of said side walls, whereby said shroud when positioned on a vehicle frame will slope backwardly from bottom to top.

In testimony whereof I have signed my name to this specification in the presence of two subscribing witnesses.

FRANK R. FAGEOL.

Witnesses:
HARRY A. TOTTEN,
D. B. RICHARDS.